United States Patent [19]

Favstritsky et al.

[11] Patent Number: 5,008,323
[45] Date of Patent: Apr. 16, 1991

[54] FLAME RETARDANT PVC RESIN COMPOSITIONS

[75] Inventors: Nicolai A. Favstritsky; Robert J. Nulph, both of Lafayette, Ind.

[73] Assignee: Great Lakes Chemical Corporation, West Lafayette, Ind.

[21] Appl. No.: 406,882

[22] Filed: Sep. 13, 1989

Related U.S. Application Data

[63] Continuation of Ser. No. 107,236, Oct. 9, 1987, abandoned.

[51] Int. Cl.$^5$ .................................................. C08K 5/03
[52] U.S. Cl. .................................... 524/469; 524/466; 524/412
[58] Field of Search .................. 524/469, 466, 412

[56] References Cited

U.S. PATENT DOCUMENTS

| | | | |
|---|---|---|---|
| 3,457,204 | 7/1969 | Burger | 524/469 |
| 3,817,912 | 6/1974 | Diebel et al. | 260/45.7 R |
| 3,850,882 | 11/1974 | Underwood et al. | 260/45.75 R |
| 3,920,606 | 11/1975 | Diebel et al. | 260/45.7 R |
| 4,098,704 | 7/1978 | Sandler | 252/8.6 |
| 4,129,551 | 12/1979 | Rueter et al. | 260/45.7 R |
| 4,154,712 | 5/1979 | Lee | 260/29.1 R |
| 4,172,826 | 10/1979 | Haaf et al. | 260/42.18 |
| 4,298,517 | 11/1981 | Sandler | 260/31.8 HA |
| 4,355,126 | 10/1982 | Haaf et al. | 524/411 |
| 4,388,429 | 6/1983 | Ilardo | 524/469 |
| 4,397,977 | 8/1983 | Sandler | 524/288 |

FOREIGN PATENT DOCUMENTS

| | | | |
|---|---|---|---|
| 1061846 | 3/1967 | United Kingdom | 524/469 |
| 1121736 | 7/1968 | United Kingdom | |
| 1298880 | 12/1972 | United Kingdom | 524/469 |

*Primary Examiner*—Joseph L. Schofer
*Assistant Examiner*—Peter D. Mulcahy
*Attorney, Agent, or Firm*—Woodard, Emhardt, Naughton, Moriarty & McNett

[57] ABSTRACT

Flame retardant PVC compositions incorporate a non-flame retardant primary plasticizer, an effective amount of a polybrominated higher alkylbenzene or mixture thereof, a stabilizer and an enhancing agent.

7 Claims, No Drawings

FLAME RETARDANT PVC RESIN COMPOSITIONS

CROSS-REFERENCE

This application is a continuation of applicants' co-pending application Ser. No. 107,236, filed Oct. 9, 1987 now abandoned.

BACKGROUND OF THE INVENTION

1. Field of the Invention

The present invention relates to flame retardant polyvinyl chloride ("PVC") resin compositions and more particularly to PVC resin compositions incorporating polybrominated higher alkylbenzenes.

2. Description of the Prior Art

Traditionally, most flame retardants, although efficient in their function of retarding the rate of combustion in a resin system, have a tendency to affect adversely one or more key properties of the resin. For example, many flame retardant additives tend to reduce impact strength of the resin; to migrate from the resin composition, resulting in a phenomenon known as "spew"; to volatilize from the resin composition; to plasticize the resin composition adversely, thus lowering the heat deflection temperature, etc.

It is therefore essential that a flame retardant agent be specifically tailored to the resin system so that, in addition to its role as a flame retardant, the agent will additionally enhance the desirable characteristics of the resin composition. Those skilled in the art well know that the selection of such an application-specific flame retardant is unpredictable at best. Thus, even though a given agent may exhibit utility in a particular resin system, that is no guarantee that this agent will have any use at all with other resins.

Among the PVC markets requiring flame retardance are wall coverings, mine belting, film and sheeting, cellular insulation, wire and cable insulation and coated fabrics. Although PVC is naturally flame retardant due to its chlorine content, these applications require plasticization of the resin in order to achieve the desired properties. The most common plasticizers used in PVC are classified as phthalates, aliphatic diesters, phosphates, and trimellitates. Unfortunately all of these plasticizers are either volatile, non-flame resistant, thermally unstable or have a tendency to migrate.

A family of thermally stable halogenated phthalate PVC plasticizers is disclosed in U.S. Pat. Nos. 4,298,517, 4,397,977 and 4,098,704. However, these materials are not entirely satisfactory because, in addition to being only average plasticizers, they suffer from excessive spew and are quite thermally unstable.

Underwood, et al. U.S. Pat. No. 3,850,882 discloses a three component flame retardant additive system for polyolefins, especially polypropylene, consisting of (a) among other halogenated materials, a halogenated alkyl benzene of the formula

where X may be Cl or Br; and Y is a hydrocarbon of 1–20 carbon atoms; a is an integer from 0 to 3; and n is an integer from 3 to 6;

(b) stannic oxide; and
(c) a bis-phenylalkylene hydrocarbon.

The patent does not suggest that such a flame retardant mixture has any utility in PVC resins, let alone that the halogenated alkylbenzene would have any such use.

Rueter, et al. U.S. Pat. No. 4,129,551 discloses non-flammable polyester compositions incorporating a phosphorus-containing, multiple component flame retardant additive consisting of:

(a) a triarylphosphine oxide or an aryl or alkyl ester of an arylphosphinic acid;
(b) a nuclear brominated alkylbenzene; and
(c) customary auxiliary agents and additives.

Polyester compositions based on such agents contain 0.5–10% by weight of bromine and 0.1–2% by weight of phosphorus. Among the nuclear brominated alkylbenzenes described were compounds of the following formula:

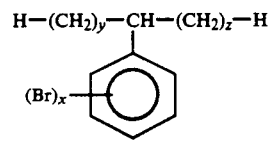

where x=2 to 5, y and z each are zero or an integer from 1 to 17 and sum of y+z is an integer between 7 and 17 or a mixture thereof.

Mixtures of such agents are also suggested. There is no disclosure that the additive mixture has any utility in PVC resins or that the nuclear brominated alkylbenzene may be so-used alone for that or any other purpose.

Thus, a primary objective of this invention is to provide halogenated resin compositions incorporating superior flame retardant plasticizing agents.

A further object is to provide flame retardant plasticizers for PVC resin compositions that are flame resistant, non-volatile, thermally stable and which do not migrate.

Yet a further object is to utilize polybrominated higher alkylbenzenes as flame retardant plasticizers for PVC resin compositions.

SUMMARY OF THE INVENTION

The foregoing and other objects, advantages and features of this invention may be achieved with flame retardant PVC resin compositions comprising a PVC resin; a non-flame retardant primary plasticizer; an effective amount of a polybrominated higher ($C_{6-18}$) mono- or di-alkylbenzene or mixtures thereof; a stabilizer; and an enhancing agent.

Preferably, the polybrominated higher alkylbenzenes utilized in accordance with this invention include tetra- and penta-bromo secondary and tertiary alkyl benzenes, wherein the alkyl group contains 6–18 carbon atoms, and tri- and tetra-bromo secondary and tertiary dialkylbenzenes, wherein the alkyl groups contain 6–18 carbon atoms. These polybrominated higher alkyl benzenes preferably contain about 30–70 percent by weight bromine.

The compositions of this invention preferably comprise about 50 to 90 percent PVC thermoplastic resin, about 5–40 percent primary plasticizer, about 5–40 percent polybrominated higher alkylbenzene, about 1 to 10 percent stabilizer and about 1.0 to 15 percent enhancing agent, all by weight of the composition.

DETAILED DESCRIPTION OF THE PREFERRED EMBODIMENTS

In accordance with this invention, it has been discovered that polybrominated higher alkylbenzenes can be used partially to replace the primary plasticizer in a PVC resin formulation. The term "higher" as used herein with respect to polybrominated alkylbenzenes is intended to encompass secondary and tertiary alkylbenzenes and mixtures thereof.

More particularly, polybrominated higher alkylbenzenes are useful in the preparation of flame retardant thermoplastic PVC resins in accordance with procedures known in the art. The novel compositions of this invention are distinguished from known flame retardant PVC compositions by improved properties.

The preferred novel flame retardant PVC compositions may be further optimized by admixing from about 50% to about 70% by weight thermoplastic PVC resin; from about 15 to 25% primary plasticizer, from about 5% to about 25% by weight polybrominated higher alkylbenzene; from about 3 to 10 % stabilizer and 1% to about 15% enhancing agent, where the percentages are based on the total weight of the resulting admixture of these five components.

The PVC resins utilized in accordance with this invention are homo- and co-polymer polyvinyl chloride resins of the type exemplified by "GEON 31", a product of B. F. Goodrich.

The polybrominated higher alkyl benzene flame retardant additives utilized in accordance with the present invention are nuclear halogenated aromatic compounds of the generalized structures (I) and (II):

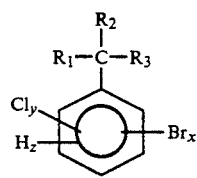

or

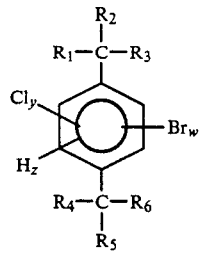

wherein x is 4 or 5, y is zero of 1, z is zero or 1, w is 2 to 4, $R_1$ and $R_4$ are hydrogen or methyl, and $R_2$, $R_3$, $R_5$, $R_6$ are alkyl ranging independently from 1 to 16 carbon atoms. Also, numerically combining $R_1$, $R_2$ and $R_3$ or $R_4$, $R_5$ and $R_6$, the total number of carbon atoms ranges from 5 to 17. Mixtures of such compounds may be produced and are especially preferred.

Compounds of structure (1) are tetra- and penta-halo secondary or tertiary alkylbenzenes, Wherein the alkyl group is of 6 to 18 carbon atoms. Compounds of structure (II) are tri- and tetra-halo secondary or tertiary dialkylbenzenes wherein the alkyl group has 6 to 18 carbon atoms.

Preferred compounds produced in accordance with this invention are secondary and tertiary octyl, nonyl, decyl, undecyl and dodecyl benzenes containing 4 to 5 bromines on the benzene nucleus. In place of individual compounds, it is especially preferred to employ mixtures of such compounds. In general, pure brominated primary alkylbenzenes are solids. However, mixtures of brominated secondary and tertiary alkylbenzenes are liquids having a a broader range of uses due to their liquid state. The polybrominated, predominantly secondary and tertiary, alkyl- and dialkyl-benzenes produced in accordance with this invention generally have a bromine content between 30% and 70% and a chlorine content between 0% and 10%, by weight.

The polybrominated alkyl benzenes of this invention are produced by the direct bromination of the corresponding unbrominated material using an excess of liquid bromine as the reaction medium, using bromine chloride as the brominating agent, and using an antimony halide catalysts described in Favstritsky, et al. copending United States Patent Application entitled "Process for Producing Polybrominated Higher Alkylbenzenes, filed herewith.

As noted above, it is preferred to utilize mixtures of individual polybrominated alkylbenzenes in accordance with this invention, and these mixtures may be derived from mixtures of the corresponding alkyl benzenes. The mixtures of individual polybrominated alkyl benzenes that are most preferred are so-preferred for the additional reason that the corresponding hydrocarbon mixtures are readily available intermediates in the detergent industry.

Especially preferred polybrominated alkylbenzenes in accordance with this invention are the tetra- and penta-bromo derivatives of secondary, straight chain alkylbenzenes of the structure(III):

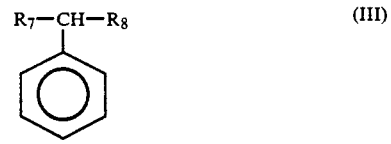

where $R_7$ and $R_8$ are independently linear alkyl groups containing 1 to 12 carbon atoms and where, when numerically combined, $R_7$ and $R_8$ contain between 9 and 13 carbon atoms, primarily 9 and 11 carbon atoms and where $R_7$ is about 25 to 35% methyl. Such a secondary, straight chain alkylbenzene is commercially available from Monsanto Co. under the trademark "DODANE S," which is a mixture of secondary monoalkylbenzenes, wherein the alkyl is primarily undecyl and dodecyl.

Another preferred polybrominated alkylbenzene is derived from a secondary, straight chain alkylbenzene of formula (III), wherein the numerical combination of $R_7$ and $R_8$ is between 9 and 11 carbon atoms and where $R_7$ is about 10 to 15% methyl. Such a preferred alkylbenzene is commercially available from Monsanto Co. under the trademark "ALKYLATE 215," which is a mixture of secondary monoalkylbenzenes similar to "DODANE S."

Still another preferred polybrominated alkyl benzene is derived from a tertiary, branched chain alkylbenzene of the formula (IV):

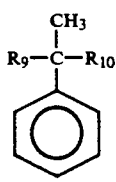

(IV)

where $R_9$ and $R_{10}$ are independently alkyl groups containing 1 to 9 carbon atoms and where the numerical combination of $R_9$ and $R_{10}$ is primarily 8 to 11 carbon atoms. Such a tertiary alkyl benzene, in which $R_9$ and $R_{10}$ are typically nonlinear alkyl groups, is commercially available from Monsanto Co. under the trademark "DODANE H," which is a mixture of tertiary branched chain, monoalkylbenzenes, wherein alkyl is primarily dodecyl.

Still another preferred polybrominated alkylbenzene is derived from a secondary, straight chain dialkylbenzene of the formula (V)

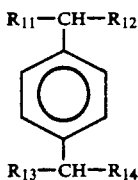

(V)

where $R_{11}$, $R_{12}$, $R_{13}$, and $R_{14}$ are independently linear alkyl groups containing 1 to 10 carbon atoms and where, when numerically combined, $R_{11}$ and $R_{12}$ or $R_{13}$ and $R_{14}$ contain primarily 11 carbon atoms. Such a material, in which para substitution predominates and which contains up to 10% monoalkylbenzenes, is commercially available from Pilot Chemical Co. under the trademark "ARISTOL E," which is a mixture of secondary dialkyl benzenes wherein alkyl is primarily dodecyl. Other commercially available alkybenzenes may of coarse also be brominated and then employed in accordance with the present invention.

The brominated alkylbenzenes of the present invention are high boiling liquids, nonvolatile, thermally stable, hydrolytically stable and flame resistant. They may be incorporated in the PVC composition of this invention during compounding as is known to those skilled in the art. In typical vinyl compounding, the components are first combined in a highspeed mixer after which the blended mass is charged to a heated, two-roll mill for fusion and further mixing. The discharged sheet may be compression molded or calendered to a desired use thickness, as is known to those skilled in the art.

The compositions of this invention also desirably incorporate one or more enhancing agents. Enhancing agents useful in accordance with this invention comprise the oxides and halides of groups IV-A and V-A of the periodic table; organic or inorganic compounds of phosphorous, nitrogen, boron, or sulfur; and oxides and halides of, for example, zinc, magnesium and titanium, all as disclosed in U.S. Pat. No. 4,016,139. Preferred enhancing agents in accordance with this invention are the oxides of antimony, arsenic and bismuth, with the oxides of antimony being especially preferred. Antimony trioxide is the most preferred enhancing agent used in the compositions of this invention. As noted, the enhancing agent is supplied at the level of about 1-15 percent by weight. Optimallly, the enhancing agent is used at a level of about 1-5 percent by weight.

As noted, the compositions of this invention also comprise non-flame retardant primary plasticizers. Suitable primary plasticizers include tri-2-ethylhexyl trimellitate and di-2-ethylhexyl phthalate hexyl phthalate. The primary plasticizer is employed in the composition at a level of about 5 to 40 percent by weight, preferably about 5 to 25 percent by weight.

The scope of the present invention includes the incorporation of other additives in the composition so far as to affect a particular end result. Such additives include, without limitation, other flame retardants, heat stabilizers, light stabilizers, plasticizers, pigments, preservatives, ultraviolet stabilizers, fillers, antioxidants, antistatic agents, and other materials well known to those skilled in the art, for example, as described in Modern Plastic Encyclopedia, Vol. 63, No. 10A, McGraw-Hill, Inc. (1986). Stabilizers should be employed at a level of about 1 to 10 percent by weight of the composition. Specific stabilizers which may be employed in accordance with this invention include dibasic lead phthalate, and basic lead silicate, for example.

The above described other additive materials which may be employed in the composition of this invention can be utilized in any amounts which will not substantially adversely affect the properties of the composition. In general, such amount will be from about 0% to about 80%, based on the total weight of the composition.

EXAMPLES

The following preparations and examples are given to illustrate the invention and should not be construed as limiting its scope. All parts are given by weight unless otherwise indicated.

Polybrominated higher alkylbenzenes, specifically polybrominated DODANE S (a polybrominated primarily dodecylbenzene), were prepared by the procedure described in copending Favstritsky, et al. United States Patent Application entitled "Process for Producing Polybrominated Higher Alkylbenzenes" filed herewith. Table I shows the bromine content, viscosity and thermal properties (as measured by thermogravimetric analysis ("TGA")) of the series of polybrominated DODANE S dodecylbenzenes.

TABLE I

| Sample | Polybrominated DODANE S | | | | | |
| --- | --- | --- | --- | --- | --- | --- |
|  | 1 | 2 | 3 | 4 | 5 | 6 |
| Br, % | 40.6 | 48.6 | 54.2 | 58.5 | 60.2 | 63.6 |
| Viscosity, cps | 53 | — | 292 | — | — | 625 |
| TGA, °C. | | | | | | |
| 1% weight loss | 163 | 186 | 211 | 231 | 222 | 221 |
| 5% weight loss | 222 | 235 | 251 | 272 | 264 | 260 |

A series of exemplary PVC compositions were formulated using the polybrominated DODANE S samples shown in Table I using formulation techniques well known to those skilled in the art

EXAMPLE 1

Onto a 2-roll mill, held at 365° F., was charged a premixed blend of 558 g of PVC resin (Geon 31 available from B. F. Goodrich Co.); 138 g of tri-2-ethylhexyl trimellitate primary plasticizer, available from Eastman Chemical Co. under the trademark "TOTM."; 27.9 g of lead stabilizer (dibasic lead phthalate available from Associated Lead, Inc. under the trademark DYTHAL); 8.4 g of antimony trioxide; and 154.5 g of brominated Dodane S, Sample 1 (Table I). After mixing for five minutes the resulting sheet was compression molded to a thickness of 0.063 inch.

EXAMPLE 2

By the same procedure as Example 1 were combined 500 g of PVC resin, 134.3 g of TOTM, 25 g of DYTHAL stabilizer, 7.5 g of antimony trioxide and 115.7 g of Sample 2 (Table I).

EXAMPLE 3

By the same procedure as Example 1 were combined 500 g of PVC resin, 146.2 g of TOTM, 25 g of stabilizer, 7.5 g of antimony trioxide and 103.8 g of Sample 3 (Table I).

EXAMPLE 4

By the same procedure as Example 1 were combined 500 g of PVC resin, 153.8 g of TOTM, 25.g of stabilizer, 7.5 g of antimony trioxide and 96.2 g of Sample 4 (Table I).

EXAMPLE 5

By the same procedure as Example 1 were combined 500 g of PVC resin, 125 g of TOTM, 25 g of stabilizer, 7.5 g of antimony oxide and 125 g of Sample 5 (Table I).

EXAMPLE 6

By the same procedure as Example 1 were combined 500 g of PVC resin, 161.5 g of TOTM, 25 g of stabilizer, 7.5 g of antimony oxide and 88.5 g of Sample 6 (Table I).

COMPARATIVE EXAMPLE 7 (CONTROL)

By the same procedure as Example 1 were combined 500 g of PVC resin, 250 g of TOTM, 25 g of DYTHAL stabilizer, 7.5 g of antimony trioxide. This composition served as a Control sample.

From the compression molded sheets of Examples 1 through 6 and Comparative Example 7 (Control) were stamped a variety of testing specimens. These samples were tested for flammability using the oxygen index procedure of ASTM D2683. The oxygen index index test is a measure of ease of extinction of a burning specimen in a controlled nitrogen/oxygen atmosphere. For this test, a specimen of the dimensions 0.063 inches in thickness by 0.250 inches in width by 3.5 inches in length is clamped vertically at one end in a holder which is placed in a test column. A mixture of nitrogen and oxygen is introduced through the column. The nitrogen/oxygen ratio is adjusted so the specimen can be ignited at the top by a small pilot flame. The percentage of oxygen is adjusted until the level is reached where a specimen will just burn for a three-minute period or for a length of 50 millimeters. That minimum oxygen concentration is reported as the Oxygen Index ("OI"). The greater the OI value, the more flame retardant the specimen tested.

Tensile strength data were measured in accordance with the procedures of ASTM D412. A die C dumbbell specimen is clamped in an Instron testing machine fitted with appropriate grips and extensometer. A testing speed of 20 inches a minute is set, and the machine started and operated until the specimen breaks. Tensile strength at peak stress and at 100 percent strain and percent elongation are calculated from the appropriate test data.

Smoke data were obtained in accordance with ASTM E662. This procedure utilizes a prescribed test chamber fitted with a radiant heat furnace, a multiple flamelet burner and a photometric system. A sample is heated either by the furnace alone (smoldering mode) or by the furnace and the flamelets (flaming mode). The progressive loss of light transmission is plotted and the minimum point of transmission converted to maximum specific optical density, corrected, Dmc. The lower the Dmc, the lower the smoke density value for the sample. The results of these tests are given in Table II.

TABLE II

| Example | 1 | 2 | 3 | 4 | 5 | 6 | (Control) 7 |
|---|---|---|---|---|---|---|---|
| Oxygen Index | 32 | 32 | 34 | 34 | 36 | 34 | 37 |
| % Br in Specimen | 7.1 | 7.2 | 7.2 | 7.2 | 9.6 | 7.2 | ) |
| Tensile | | | | | | | |
| Peak, psi | 3370 | 3290 | 3320 | 3300 | 3550 | 3320 | 2790 |
| 100% Strain, psi | 2460 | 2440 | 2660 | 2430 | 3010 | 2780 | 2030 |
| Elong., % | 370 | 340 | 350 | 3450 | 300 | 270 | 360 |
| Smoke, Dmc | | | | | | | |
| Smoldering | — | — | — | 400 | 380 | 390 | |
| Flaming | — | — | — | — | 470 | 600 | 600 |

The data reported in Table II demonstrate the effectiveness of the additives of this invention as flame retardant plasticizers for halogenated resins such as PVC. More particularly, the data reveal that polybrominated higher alkylbenzenes are efficient plasticizing flame retardants Moreover, the higher the bromine content in the polybrominated higher alkylbenzenes, the lower the smoke yield. Based on observation of the test specimens, higher bromine content also yields greater thermal stability.

What is claimed is:

1. A flame retardant PVC resin composition comprising:
   a PVC resin:
   a non-flame retardant primary plasticizer;
   as a flame retardant plasticizer, an effective amount of a polybrominated higher alkylbenzene, wherein the polybrominated higher alkylbenzene is a compound of the structure:

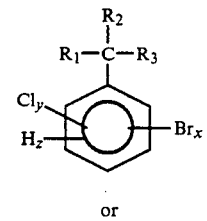

or

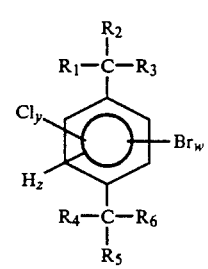

where x is 4 or 5, y is zero or 1, z is zero or 1, w is 2 to 4; where $R_1$ and $R_4$ are hydrogen or methyl, and $R_2$, $R_3$, $R_5$, $R_5$, $R_6$ are alkyl groups ranging independently from 1 to 16 carbon atoms and where the total number of carbon atoms in each of ($R_1$, $R_2$ and $R_3$) and ($R_4$, $R_5$ and $R_6$) ranges from 5 to 17; an effective amount of polybrominated higher alkylbenzene containing about 30–70 percent bromine by weight of the flame retardant plasticizer;

a stabilizer; and an enhancing agent.

2. A composition, as claimed in claim 1, wherein the polybrominated predominantly secondary alkylbenzene is a tetra-or penta-bromo secondary $C_{6-18}$ alkylbenzene.

3. A composition, as claimed in claim 1, wherein the polybrominated higher alkylbenzene is a tri- or tetra-bromo secondary or tertiary di-$C_{6-18}$ alkylbenzene.

4. A composition, as claimed in claims 2 or 3, wherein the alkyl groups are a mixture of $C_{10-12}$ alkyl groups.

5. A composition, as claimed in claims 2 or 3, wherein the polybrominated alkylbenzene is a liquid mixture of $C_{10-12}$ tetra-and pentabromoalkylbenzenes.

6. A composition, as claimed in claim 1, wherein the composition comprises about 50 to 90 percent PVC resin, about 5 to 50 percent primary plasticizer, about 5 to 40 percent polybrominated higher alkylbenzene, about 1 to 10 percent stabilizer and about 0.1 to 15 percent enhancing agent, all by weight of the flame retardant PVC composition.

7. A composition, as claimed in claim 1, wherein the enhancing agent is antimony oxide.

* * * * *